US007675627B2

(12) United States Patent
Tweedy et al.

(10) Patent No.: US 7,675,627 B2
(45) Date of Patent: Mar. 9, 2010

(54) LOW COST FIBER OPTIC VELOCITY SENSOR FOR SONAR APPLICATIONS

(75) Inventors: Michael J. Tweedy, Simi Valley, CA (US); James L. Arroyo, Granada Hills, CA (US); Shen-Hui L. Wu, Agoura Hills, CA (US)

(73) Assignee: Northrop Grumman Guidance and Electronic Company, Inc., Woodland Hills, CA (US)

( * ) Notice: Subject to any disclaimer, the term of this patent is extended or adjusted under 35 U.S.C. 154(b) by 76 days.

(21) Appl. No.: 11/973,301

(22) Filed: Oct. 5, 2007

(65) Prior Publication Data

US 2009/0091764 A1  Apr. 9, 2009

(51) Int. Cl.
*G01B 9/02* (2006.01)
(52) U.S. Cl. .................................... 356/477
(58) Field of Classification Search ................ 356/477; 73/514.26, 514.27
See application file for complete search history.

(56) References Cited

U.S. PATENT DOCUMENTS 5,420,186 A * 5/1995 Dewhurst ................... 524/236
5,883,308 A * 3/1999 Fersht ....................... 73/514.26
6,363,786 B1 * 4/2002 Fersht ....................... 73/514.26
6,496,264 B1 * 12/2002 Goldner et al. ............. 356/478
6,650,418 B2 * 11/2003 Tweedy et al. .............. 356/477

* cited by examiner

*Primary Examiner*—Michael A Lyons
(74) *Attorney, Agent, or Firm*—Lynn & Lynn

(57) ABSTRACT

A fiber optic sensor includes a housing having first and second end plates with a sidewall extending therebetween with the sidewall having an inwardly facing groove. A flexural disk having a central passage therethrough has an outer edge portion mounted in the inwardly facing groove in the housing. The flexural disk has a stepped thickness that is thinner at the outer edge portion than at a region spaced apart from the housing. A first fiber optic coil is mounted on a first side of the flexural disk in the thicker region of the flexural disk, and a second optical fiber is mounted on a second side of the flexural disk opposite the first fiber optic coil. The first and second fiber optic coils are optically coupled together by a fiber optic coupler to form an interferometer that produces an output signal in response to axial acceleration of the flexural disk.

10 Claims, 3 Drawing Sheets

LOW COST FIBER OPTIC VELOCITY SENSOR FOR SONAR APPLICATIONS

BACKGROUND OF THE INVENTION

This invention relates generally to fiber optic sensors and particularly to fiber optic sensors for sensing acceleration. Still more particularly, this invention relates to a fiber optic sensor for measuring the particle velocity of an acoustic wave that is transmitted through water by direct measurement of the transferred acoustic energy imparted to the fiber optic sensor.

Most fiber optic acoustic sensors for underwater applications are pressure-type hydrophones that measure pressure variations in sound waves.

SUMMARY OF THE INVENTION

The present invention measures the particle velocity component of a sound wave when transmitted in water. A fiber optic sensor according to the present invention comprises a housing having first and second end plates with a sidewall extending therebetween with the sidewall having an inwardly facing groove therein. A flexural disk having a central passage therethrough has an outer edge portion mounted in the inward facing groove in the housing. The flexural disk is formed to have a stepped thickness such that the flexural disk is thinner at the outer edge portion than at a region spaced apart from the housing. A first fiber optic coil is mounted on a first side of the flexural disk in the thicker region of the flexural disk, and a second optical fiber is mounted on a second side of the flexural disk opposite the first fiber optic coil. The first and second fiber optic coils are optically coupled together by a fiber optic coupler to form an interferometer that produces an output signal in response to axial acceleration of the flexural disk.

The housing may be formed of magnesium using metal injection molding. The flexural disk may also be formed of magnesium by metal injection molding or it may be formed of aluminum machined to size by standard machining methods.

The fiber optic sensor according to the present invention preferably has a hub formed integrally with the flexural disk at the inner edge. The hub preferably is formed to have a first through-hole near a first side of the flexural disk and a second through-hole near a second side of the flexural disk. The first fiber optic coil preferably is formed to have a first mirrored fiber end secured within the first through hole and the second fiber optic coil preferably is formed to have a second mirrored fiber end secured within the second through hole.

The housing preferably has an angled fiber entry/exit passage that allows fiber optic leads to pass through the housing at an angle between 45° and 60° such that the leads can make a small transition to become aligned for entry into the fiber optic coupler, thereby minimizing fiber stress and optical bend loss.

The first and second end caps of the housing preferably have a plurality of radial stiffening ribs extending between the hub and the housing sidewall with each of the first and second end caps having an odd number of such ribs to reduce low frequency mechanical resonance vibrations.

DETAILED DESCRIPTION OF THE INVENTION

Figure 1:
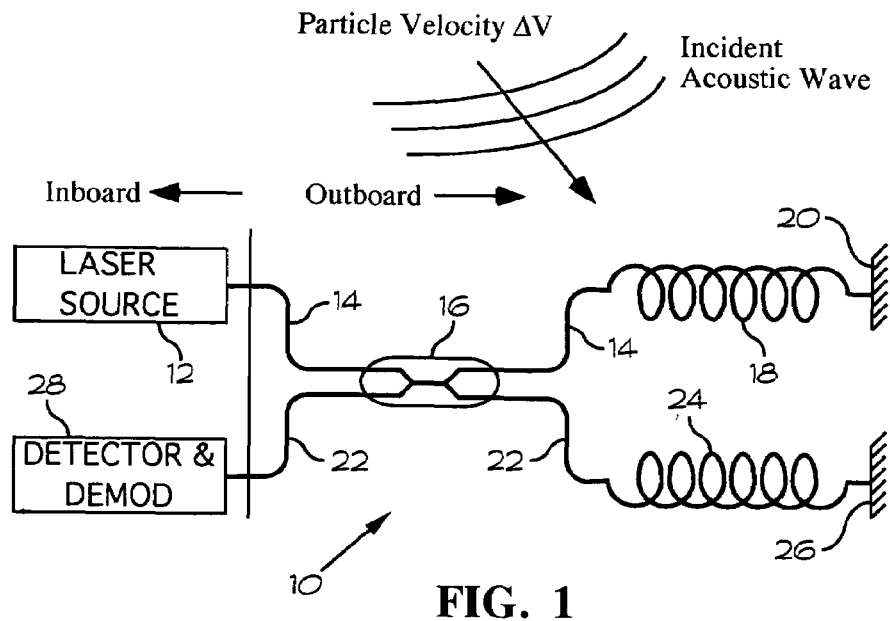
FIG. 1 is a schematic diagram of the invention.

FIG. 1 illustrates a fiber optic sensor 10 that is formed as a Michelson interferometer. A laser source 12 produces optical signals that are input to an optical fiber 14 that guides the optical signals to a 2×2 optical coupler 16. A first portion of optical signals input to the optical coupler 16 by the optical fiber 14 remains in the optical fiber 14 and propagates through the optical coupler 16 to a coil 18 formed in the optical fiber 14. After passing through the coil 18, the signals reflect from a mirrored end 20 of the optical fiber 14 and propagate through the coil 18 a second time before reaching the optical coupler 16 again.

The optical coupler 16 couples a second portion of optical signals input to the optical fiber 14 from the laser source 12 into an optical fiber 22 that has a coil 24 formed therein. After passing through the coil 24, the optical signals reflect from a mirrored end 26 of the optical fiber 22 and propagate back through the coil 24 to the optical coupler 16. The optical coupler 16 couples part of the reflected optical signal incident thereon via the optical fiber 14 into the optical fiber 22 so that the two reflected optical signals are combined in the optical fiber 22. The combined optical signals then are incident upon a photodetector and demodulation module 28.

The coils 18 and 24 are arranged so that the particle velocity of an incident underwater acoustic wave causes the length of the optical path through the coil 18 changes by an amount ΔL and the length of the optical path through the coil 24 changes by an amount −ΔL. These changes in the optical path lengths produce a phase difference in optical signals that have traversed the two optical paths. The phase difference may be expressed as $$\Delta\Phi = \frac{2\pi\eta(4\Delta L)}{\lambda},$$

where η is the refractive index of the optical fibers 14 and 22 and λ is the wavelength of the optical signal output from the laser source 12.

Figure 2:
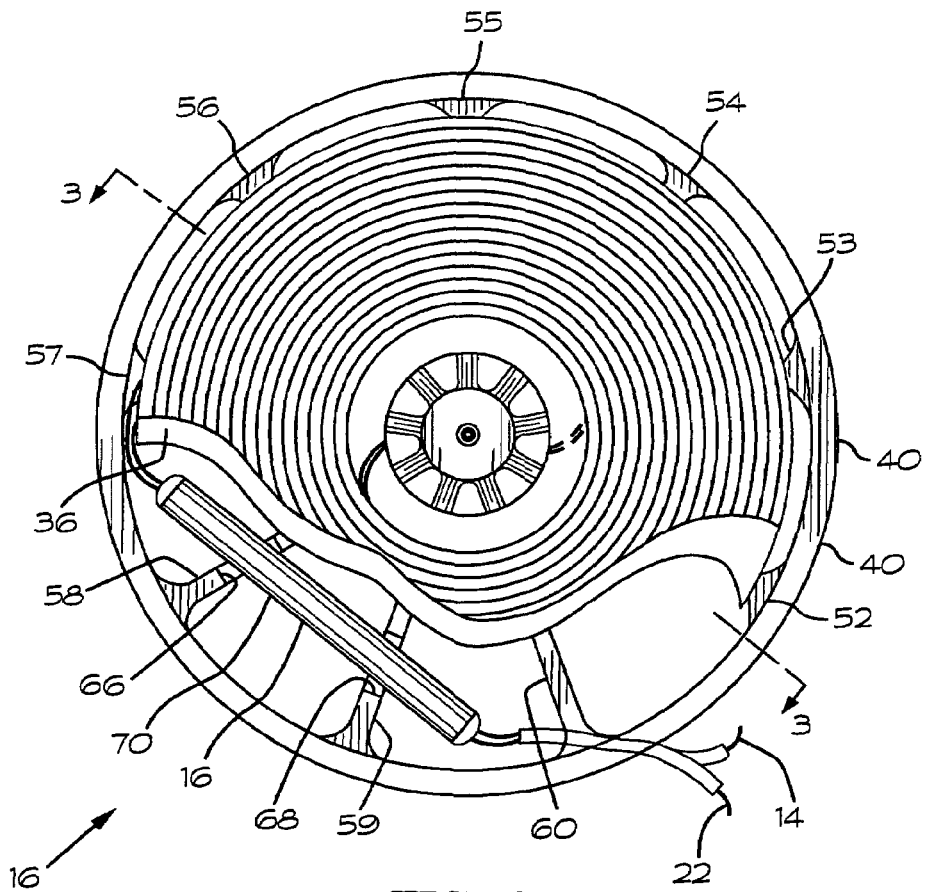
FIG. 2 is a top plan view of a portion of the invention.
Figure 3:
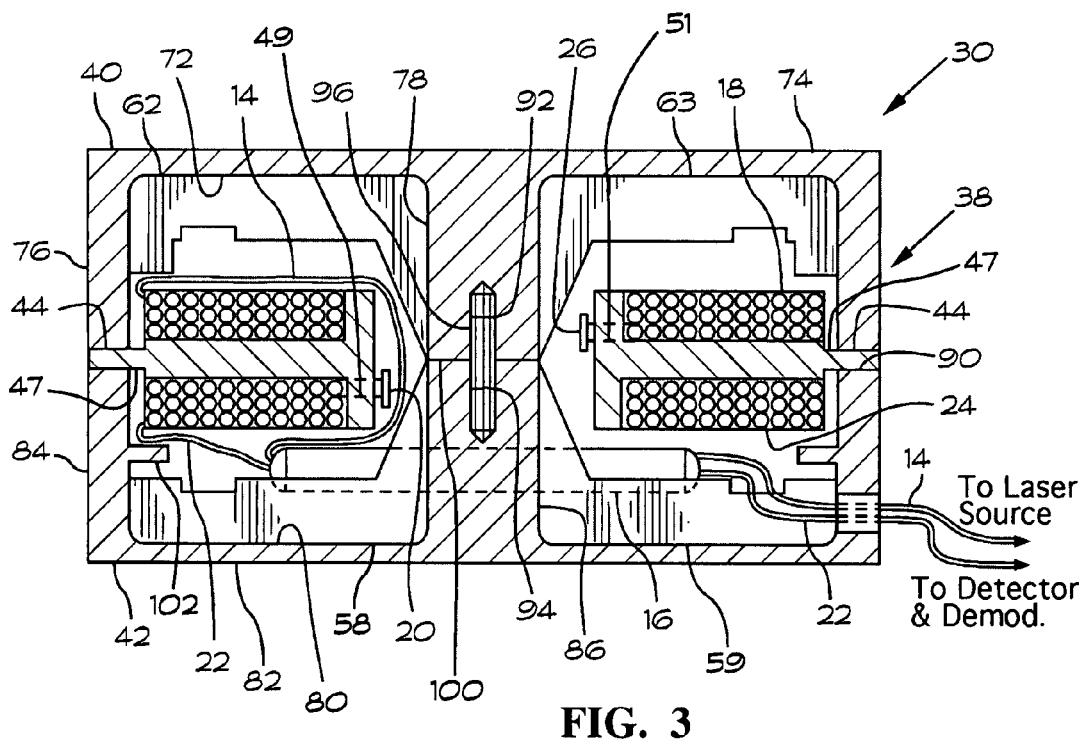
FIG. 3 is a cross sectional view of the sensor structure taken along line 3-3 of FIG. 2.
Figure 4:
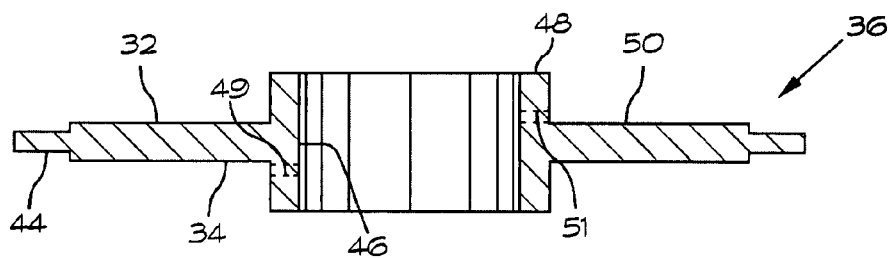
FIG. 4 is a cross sectional view of a flex disk that may be included in the sensor structure of FIGS. 2 and 3.

FIGS. 2 and 3 illustrate a sensor module 30 according to the present invention. The coils 18 and 24 in the optical fibers 14 and 22 are formed on opposite sides 32 and 34, respectively, of a stepped flex disk 36, which is best shown in FIGS. 3 and 4. The stepped flex disk 36 is preferably formed of aluminum. The flex disk 36 is mounted in a housing 38 that is formed of a first section 40 and a second section 42.

Referring to FIGS. 3 and 4, the stepped flex disk 36 has an outer rim 44 and a central passage 46. A circular flange 48 extends around the periphery of the central passage 46. The circular flange 48 has a thickness that is preferably greater than the thickness of the outer rim 44. The flex disk 36 has a region 50 between the outer rim 44 and the circular flange 48 that has a thickness preferably greater than the thickness of the outer rim 44 and less than the thickness of the circular flange 48. Referring to FIGS. 3 and 4, the fiber optic coils 18 and 24 are formed on the region 50 of the stepped flex disk 36.

Figure 5:
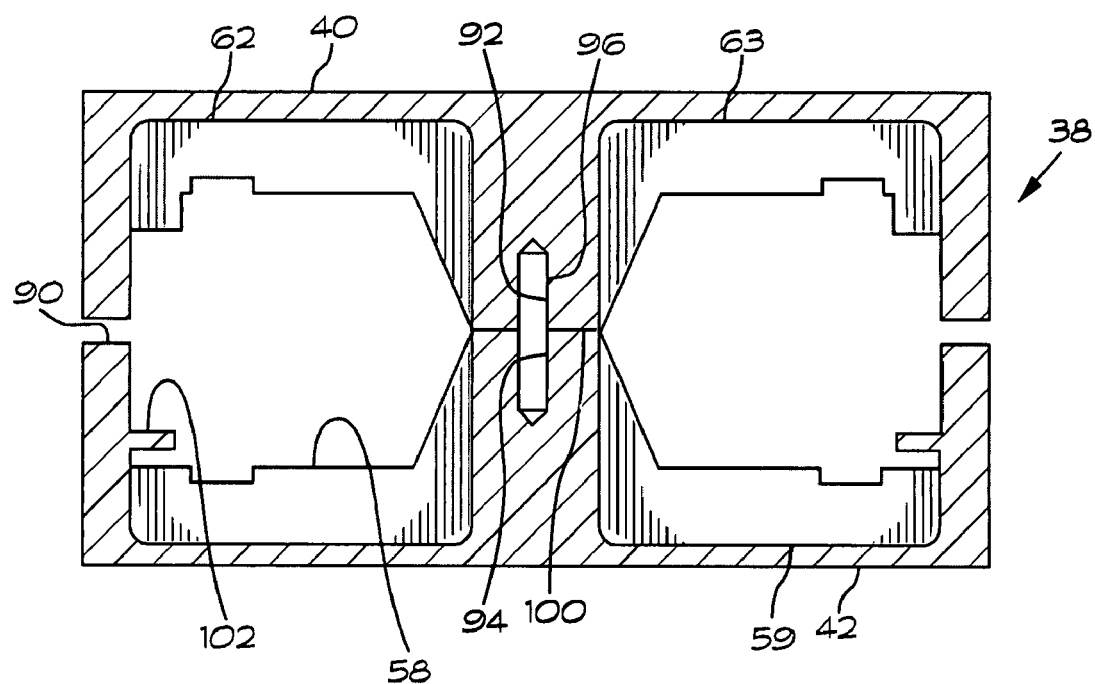
FIG. 5 is a cross sectional view of a housing that may be included in the sensor structure of FIGS. 2 and 3.

Referring to FIGS. 2, 3 and 5, the housing 38 includes a plurality of stiffening ribs 52-60 in the second section 42 of the housing 38. The first housing section 40 includes similar stiffening ribs. FIG. 3 shows two such ribs 62 and 63. As shown in FIG. 2, the stiffening ribs 58 and 59 include slots 66 and 68. The optical coupler 16 includes an elongate coupler housing 70 that is arranged to extend through the slots 66 and 68.

As shown in FIG. 3, the housing section 40 includes a cavity 72 that is enclosed by an end wall 74 and a cylindrical sidewall 76. A post 78 extends from the center of the end wall 74 into the region enclosed by the cylindrical sidewall 76. The housing section 42 includes a cavity 80 that is enclosed by an end wall 82 and a cylindrical sidewall 84. A post 86 extends from the center of the end wall 74 into the region enclosed by the cylindrical sidewall 84. The housing sections 40 and 42 are formed so that when they are juxtaposed with the ends of the posts 78 and 86 in contact, a small gap 90 is formed at the facing edges of the cylindrical sidewalls 76 and 84. The posts 78 and 86 include facing central recesses 92 and 94, respectively. The posts 78 and 86 preferably are joined by a dowel pin 96 that is placed in the recesses 92 and 94 that serve to coaxially align posts 78 and 86 and housings sections 40 and 42 together. An adhesive may be applied to a bond line 100 at facing ends of the posts 78 and 86 to bond them together. Adhesive is preferentially also used to bond the outer rim 44 of the flex disk 36 to the housing sections 40 and 42.

The outer rim 44 of the flex disk 36 is securely retained in the gap 90 when the sensor 10 is fully assembled. The posts 78 and 86 have outer diameters that are smaller than the inner diameter of the passage 46 in the flex disk 36 so that the flange 48 extends around the posts 78 and 86. The circular flange 48 contains two diametrically opposed holes or slots 49 and 51 to allow passage of the mirrored fiber ends 20 and 26 respectively through the flange where it may be bonded securely to the inner diameter of the flange hub 48 as shown in FIGS. 2 and 3.

A portion 47 of the outer rim 46 of the flex disc 36 extends out of the gap 90 and acts as a hinge when the flex disc 36 is subjected to acceleration along a sensing axis that is perpendicular to the plane of flex disk 36.

An incoming acoustic wave that impinges on the sensor 10 causes a very minute motion of the sensor housing 30 due to inertial forces. This motion in turn is imparted to the sensor's internal flex disk 36 that has the upper and lower optical fiber coil packs 18 and 24 attached thereto. The coil packs 18 and 24 are configured in a differential mode whereby any movement along the input axis of the sensor 10 causes one set of fiber coils to go into compression and the opposite set to undergo tensile expansion. When laser light is introduced into the optical fiber 14, it splits at the optical coupler 16 and propagates along two separate paths through the two coils 18 and 24. The end faces 20 and 26 of the fibers 14 and 22, respectively, at the ends of the coils 18 and 24 have mirror coatings applied so that the laser beam is reflected back through the coils 18 and 24 and recombined in the coupler to form a Michelson interferometer. An interference pattern is generated whenever acoustic motion causes a differential change in optical path length between the coil 18 and the coil 24. A signal indicating creation of an optical phase difference (or phase modulation) is fed by the output fiber 22 directly to an external demodulator 28 that recovers the original acoustic information. The theory and operation of the Michelson interferometer are well known to practitioners of the art within the fiber optic industry.

The principal end-use of this invention is for deployment in large aperture underwater two dimensional planar arrays (not shown) used in military systems. Such arrays require hundreds of individual sensing elements whose outputs are combined in a cooperative manner that permits creation of a highly-sensitive, steerable receiving beam that can be used for any type of sonar application including intelligence gathering, threat assessment, and targeting activities. To make such a system affordable and practical, it is necessary that the individual sensors be manufactured as nearly identical to one another and to be significantly less expensive than the current state-of-art designs.

The specific features of the sensor 10 according to the present invention that represent an improvement over previous velocity sensor designs and provide the potential to reduce sensor cost by half are detailed as follows:

1. Low-Cost Fabrication Techniques.

Typical fabrication of the sensor housings is currently done by Computer Numerical Control (CNC) machining to achieve near-identical reproduction of the sensor components. Although this methodology produces consistent hardware pieces, it is a relatively inefficient process since the parts often have to be machined from a solid block of material, which generates a large amount of material waste. In addition, it is a time-consuming process with several tool changes being required throughout the machining operation. The proposed method of fabrication for this invention is metal-injection molding (MIM), which has the ability to create final shape components that hold precision tolerances (±0.003") at about a quarter of the recurring cost of similar CNC-machined components. An alternate cost-effective method is to cast the parts; but because of problems in strength, porosity, voids, and poor tolerances achieved by this method (typically ±0.020"), the casting process is deemed unsuitable for production of precision hardware.

2. Use of Alternate Materials of Construction.

The choice of magnesium as a sensor housing material has several advantages over standard aluminum, the material of choice for prior art devices. Whereas aluminum cannot be metal-injection molded, magnesium is quite amenable to this process. The cost of magnesium powder used in MIM-type processes is considered inconsequential since there is virtually no waste when a final molded product is produced. Under elevated heat and pressure, the magnesium powder develops thixotropic flow properties similar to plastic molding materials. In addition, magnesium has several advantages over other powder metallurgy candidates because it does not require the addition of an intermediate binder to retain the part shape until high temperature sintering is performed.

Typically, high temperature sintering is required to bake out the binder on powdered metals other than magnesium which results in a typical 17% shrinkage rate of the final part which makes it difficult to achieve uniform, repeatable tolerances. Magnesium, on the other hand, requires no binder addition (and subsequent sintering) and has less than 0.5% shrinkage with very little cleanup (e.g. typically sprue removal) required. The use of magnesium as a MIM material has an added benefit in that it has inherently higher internal damping characteristics over wrought or forged materials which results in a more desirable lower-Q structural characteristic. Concerns of potential corrosion are not warranted since a standard anodic protection coat per MIL-M-45202 can be added at very little cost during batch processing of hundreds of housings at one time. Additionally, although magnesium has about ⅔ the density of aluminum, the coefficient of thermal expansion (CTE) is nearly identical (14 $\mu$-in/in/° F. for Mg versus 13 $\mu$-in/in/° F. for Al) whenever a composite sensor requiring use of both materials is needed. A final advantage for the choice of magnesium over aluminum is that it allows overall reductions in sensor weight and size since there is a requirement for neutral buoyancy where the sensor has to closely match the density of water (or the encapsulating medium) to permit matched acoustic impedance. If a sensor's equivalent density or weight exceeds this requirement, the housing often has to be enlarged to create the additional volume needed to achieve the buoyancy target.

3. Stepped Flex Disk Construction.

This invention incorporates a novel outer diameter stepped flexure construction as shown in FIGS. 3 and 4. Computer analysis indicates an increase of nearly 1 dB in scale factor (SF) can be achieved by increasing the separation between upper and lower fiber coil packs from the neutral bend axis. The greater the distance from the neutral axis, the greater the compressive and tensile forces act to increase radial fiber strain and thus produce correspondingly greater path length differences. This cannot be achieved with simply increasing the thickness of the entire flex disk since the overall increased stiffness would reduce overall flex disk deflection (and scale factor sensitivity) while increasing $F_R$ (sensor resonance) higher than desired. Normally, the flex disk and housing materials are manufactured from the same material (such as magnesium), but in some cases, such as this design, the computer analysis did indicate a higher scale factor could be achieved due to increased pendulosity effects of the heavier aluminum substrate driving the fiber harder.

As previously mentioned, a sensor combining magnesium and aluminum components would have little environmental sensitivity because of the closely matched CTEs. An added benefit of the step would be during the fiber winding process, wetted fiber would not deposit winding adhesive on the outer land surface 44 of the flex disk, which needs to be free of any buildup of cured epoxy prior to the critical flex disk-to-case bonding.

4. Dual-Winding Capability With Integral Flexure Hub.

An additional feature of the improved flex disk design is the incorporation of an integral hub or circular flange at the inner diameter as shown in FIGS. 2 and 3. Past practice of previous designs was to wind each coil pack separately with an individual start fiber and end fiber exiting the coil pack. The start leads are typically cleaved and mirrored at a later time following all winding operations. To prevent excessive micro-bend losses of the start fiber resulting from fiber crossovers, previous designs created a spiral groove on both sides of the flex disk to isolate the start lead from the remaining fibers of the coil pack. After curing of the first coil pack, the other side would be wound separately and cured as well with four fibers emanating from the wound flex disk at completion. The four fibers were extremely fragile and in many instances a fiber would be broken due to inadvertent handling damage, especially when feeding the fiber through the elongated cross-over slot prior to the second wind. The machining of the spiral groove, cross-over slot and subsequent burr removal of the previous flat flex disk design were labor-intensive operations that created needless additional cost.

This invention circumvents these previous problems by adding a mirrored start fiber through either through-holes 49 and 51 or slots (not shown) in the circular flange 48. To protect the mirrored ends 20 and 26, an overcoat of an UV-curable adhesive is applied to lock the fibers in place and to insulate the tip of the fragile mirrored ends 20 and 26 from incidental contact damage. In addition, by allowing the mirrored fiber ends 20 and 26 to be placed inside the hub cylinder 48 itself provides an additional degree of protection from physical handling of the flex disk assembly. With the elimination of the concern over routing and handling of the fiber start leads, it becomes relatively easy to design a winding fixture to allow simultaneous dual winding of both sides at once, cutting the processing time in half.

5. Angled Fiber Entry Into Housing.

Previous designs have the input and output fiber leads exiting the housing in a radial direction. Inside the sensor the fiber needs to make a relatively sharp turn and route along the internal peripheral wall until it reaches the fiber coupler. As can be seen in FIG. 2, this invention allows the fiber to enter the housing through a passage 108 at a 45° to 60° angle where it can make a small transition to become in line with the fiber entry point of the coupler 16 thereby eliminating a potential point of high fiber stress and optical bend loss. An additional benefit is gained with the angled entry in that an effectively longer through-hole length is created that increases the internal bonded surface area and enhances the sealing of the fiber-to-case seal.

6. Odd Number of Stiffening Ribs.

Earlier designs have featured a symmetrical rib layout that typically included an even number of ribs (e.g. 4, 6, or 8). Computer analysis has shown that incorporation of an even number of elements can inadvertently facilitate lower frequency structural bending modes to occur with an undesirable excitation or interaction within the acoustic band of interest. Utilizing an odd number of stiffening elements (e.g. -5, 7 or 9), makes the geometry less prone to introducing undesirable lower frequency structural resonances. This is shown in FIG. 2 of this disclosure.

This invention incorporates other design features described in earlier patents (U.S. Pat. No. 6,650,418 B2 and U.S. Pat. No. 6,473,183 B1) such as direct wet winding, edge-support disk mounting, center post stiffener, dowel pin press fit, integral fiber holding tabs, radial rib stiffeners, integral coupler mounting notches, and thin floor thickness (for matched compressibility of water) and as such are mentioned as being relevant to this invention but are not added as specific claims to this invention.

The structures and methods disclosed herein illustrate the principles of the present invention. The invention may be embodied in other specific forms without departing from its spirit or essential characteristics. The described embodiments are to be considered in all respects as exemplary and illustrative rather than restrictive. Therefore, the appended claims rather than the foregoing description define the scope of the invention. All modifications to the embodiments described herein that come within the meaning and range of equivalence of the claims are embraced within the scope of the invention.

What is claimed is:

1. A fiber optic sensor, comprising:
   a housing having first and second end plates with a sidewall extending therebetween, the sidewall having an inwardly facing groove therein;
   a flexural disk having a central passage therethrough and having an
   outer edge portion mounted in the inward facing groove in the housing, the flexural disk being formed to have a stepped thickness such that the flexural disk has a first thickness at the outer edge portion and a second thickness in a region spaced apart from the housing, the first thickness being less than the second thickness; and
   a first fiber optic coil mounted on a first side of the flexural disk in the region of the flexural disk having the second thickness and a second optical fiber mounted on a second side of the flexural disk opposite the first fiber optic coil, the first and second fiber optic coils being optically coupled together by a fiber optic coupler to form an interferometer that produces an output signal in response to axial acceleration of the flexural disk,
   wherein the flexural disk has a selected inner diameter for the central passage and a hub is formed at the inner diameter integrally with the flexural disk, the hub being formed to have a first through-hole near a first side of the flexural disk and a second through-hole near a second side of the flexural disk, the first fiber optic coil being formed to have a first mirrored fiber end secured within the first through hole and the second fiber optic coil being formed to have a second mirrored fiber end secured within the second through hole.

2. The fiber optic sensor of claim 1 wherein both the housing and the flexural disk are formed of magnesium using metal injection molding.

3. The fiber optic sensor of claim 1 wherein the housing is formed of magnesium by metal injection molding and the flexural disk is alternately formed of aluminum by standard machining methods.

4. The fiber optic sensor of claim 1 wherein the housing has an angled fiber entry/exit passage that allows fiber optic leads to pass through the housing at an angle between 15° and 60° such that the leads can make a small transition to become aligned for entry into the fiber optic coupler, thereby minimizing fiber stress and optical bend loss.

5. The fiber optic sensor of claim 1 wherein each of the first and second end caps of the housing have a plurality of radial stiffening ribs extending between the hub and the housing sidewall with each of the first and second end caps having an odd number of such ribs to reduce low frequency mechanical resonance vibrations.

6. A method for forming a fiber optic sensor, comprising the steps of: providing a housing having first and second end plates with a sidewall extending therebetween;
    forming an inwardly facing groove in the sidewall;
    forming a flexural disk having stepped thickness and having a central passage therethrough; mounting an outer edge portion of the flexural disk in the inward facing groove in the housing, the flexural disk being formed to have a first thickness at the outer edge portion and a second thickness in a region spaced apart from the housing, the first thickness being less than the second thickness; and
    mounting a first fiber optic coil mounted on a first side of the flexural disk in the region of the flexural disk having the second thickness;
    mounting a second optical fiber on a second side of the flexural disk opposite the first fiber optic coil;
    optically coupling the first and second fiber optic coils together by a fiber optic coupler to form an interferometer that produces an output signal in response to axial acceleration of the flexural disk;
    forming the flexural disk to have a selected inner diameter for the central passage;
    forming a hub at the inner diameter integrally with the flexural disk; forming the hub to have a first through-hole near a first side of the flexural disk and a second through-hole near a second side of the flexural disk;
    forming the first fiber optic coil to have a first mirrored fiber end; fastening the first mirrored fiber end within the first through hole; forming the second fiber optic coil being formed to have a second mirrored fiber end; and
    fastening the second mirrored fiber end within the second through hole.

7. The method of claim 6 including the step of forming both the housing and the flexural disk of magnesium using metal injection molding.

8. The method of claim 6 including the step of for forming the housing of magnesium by metal injection molding and the flexural disk is formed of aluminum by standard machining methods.

9. The method of claim 6 including the step of forming the housing to have an angled fiber entry/exit passage that allows fiber optic leads to pass through the housing at an angle between 45° and 60° such that the leads can make a small transition to become aligned for entry into the fiber optic coupler, thereby minimizing fiber stress and optical bend loss.

10. The method of claim 6 including the steps of forming each of the first and second end caps of the housing to have a plurality of radial stiffening ribs extending between the hub and the housing sidewall with each of the first and second end caps having an odd number of such ribs to reduce low frequency mechanical resonance vibrations.

* * * * *